(12) United States Patent
Bansal

(10) Patent No.: US 11,477,264 B2
(45) Date of Patent: Oct. 18, 2022

(54) NETWORK WORKFLOW REPLAY TOOL

(71) Applicant: Nicira, Inc., Palo Alto, CA (US)

(72) Inventor: Kaushal Bansal, Pleasanton, CA (US)

(73) Assignee: NICIRA, INC., Palo Alto, CA (US)

( * ) Notice: Subject to any disclaimer, the term of this patent is extended or adjusted under 35 U.S.C. 154(b) by 1318 days.

(21) Appl. No.: 15/422,967

(22) Filed: Feb. 2, 2017

(65) Prior Publication Data

US 2018/0006902 A1 Jan. 4, 2018

Related U.S. Application Data

(60) Provisional application No. 62/356,379, filed on Jun. 29, 2016.

(51) Int. Cl.
*G06F 15/16* (2006.01)
*H04L 67/10* (2022.01)
(Continued)

(52) U.S. Cl.
CPC .......... *H04L 67/10* (2013.01); *G06F 11/3006* (2013.01); *G06F 11/3457* (2013.01);
(Continued)

(58) Field of Classification Search
CPC ....... H04L 41/22; H04L 41/145; H04L 67/10; G06F 11/34; G06F 9/5077
(Continued)

(56) References Cited

U.S. PATENT DOCUMENTS

| 7,315,807 B1 * | 1/2008 | Lavallee | H04L 41/145 |
| | | | 703/21 |
| 2003/0212908 A1 * | 11/2003 | Piesco | H04L 41/08 |
| | | | 726/25 |

(Continued)

FOREIGN PATENT DOCUMENTS

| EP | 1518648 A2 * | 3/2005 | B25J 9/1664 |
| WO | WO-2016089434 A1 * | 6/2016 | G06F 11/1438 |

OTHER PUBLICATIONS

A distributed network simulation environment for multi-processing systems C. Jacob;P. Wilke [Proceedings] 1991 IEEE International Joint Conference on Neural Networks (Year: 1991).*

(Continued)

*Primary Examiner* — Younes Naji
*Assistant Examiner* — Oluwatosin M Gidado
(74) *Attorney, Agent, or Firm* — Adeli LLP

(57) ABSTRACT

A method of automatically identifying and recreating tenants environment issues in a set of datacenters by a workflow replay tool is provided. Each datacenter includes a network manager server. The method analyzes, by the workflow replay tool, a set of log files generated in the particular tenant's environment to identify tenant's workflows. The method analyzes, by the workflow replay tool, network manager server databases of the tenant's environment to identify the logical entities in the tenant environment used by the identified workflows. The method allocates resources in a lab environment to simulate the tenant's environment. The method reruns the identified tenant's workflows by the workflow replay tool using the allocated resources in the lab environment to recreate tenant environment issues.

22 Claims, 8 Drawing Sheets

(51) Int. Cl.
  *H04L 41/14* (2022.01)
  *G06F 11/34* (2006.01)
  *G06F 11/30* (2006.01)
  *H04L 41/22* (2022.01)

(52) U.S. Cl.
  CPC ........ *G06F 11/3476* (2013.01); *H04L 41/145* (2013.01); *G06F 2201/835* (2013.01); *H04L 41/22* (2013.01)

(58) Field of Classification Search
  USPC .................................................. 709/223, 226
  See application file for complete search history.

(56) References Cited

U.S. PATENT DOCUMENTS

| | | | | |
|---|---|---|---|---|
| 2006/0264918 | A1* | 11/2006 | Cook | A61B 18/22 606/10 |
| 2007/0067373 | A1* | 3/2007 | Higgins | G06F 11/3013 |
| 2010/0146240 | A1* | 6/2010 | Hu | H04L 41/082 711/202 |
| 2011/0055815 | A1* | 3/2011 | Squillace | G06F 11/3612 717/125 |
| 2014/0282813 | A1* | 9/2014 | Botzer | H04L 63/20 726/1 |
| 2014/0325290 | A1* | 10/2014 | Gutjahr | G06F 11/079 714/48 |
| 2015/0016278 | A1* | 1/2015 | Hayes | H04L 43/0864 370/249 |
| 2015/0160966 | A1* | 6/2015 | Archer | G06F 9/5066 718/102 |
| 2015/0370674 | A1* | 12/2015 | Lazar | G06F 11/263 705/14.1 |
| 2016/0342499 | A1* | 11/2016 | Cheng | G06F 11/3644 |
| 2016/0350367 | A1* | 12/2016 | Fischer | G06F 16/256 |
| 2017/0083643 | A1* | 3/2017 | Seigel | G06F 9/45533 |
| 2017/0310738 | A1* | 10/2017 | Bansal | H04L 67/10 |

OTHER PUBLICATIONS

Simulation recurrence of a realistic DC line fault based on RTDS and its simulation reliability analysis Xudong Jia;Gengyin Li;Chengyong Zhao;Xiangning Xiao 2009 IEEE/PES Power Systems Conference and Exposition Year: 2009 | Conference Paper | Publisher: IEEE (Year: 2009).*

Modeling for Traffic Replay in Virtual Network Lun Li;Zhiyu Hao;Yongzheng Zhang;Yongji Liu;Dahui Li 2018 IEEE 20th International Conference on High Performance Computing and Communications; IEEE 16th International Conference on Smart City; IEEE 4th International Conference on Data Science and Systems (Year: 2018).*

* cited by examiner

NETWORK WORKFLOW REPLAY TOOL

CLAIM OF BENEFIT TO PRIOR APPLICATIONS

This application claims the benefit of U.S. Provisional Patent Application 62/356,379, filed Jun. 29, 2016. U.S. Provisional Patent Application 62/356,379 is incorporated herein by reference.

BACKGROUND

Virtualization is the ability to simulate a hardware platform, such as a server, storage device or network resource, in software. Network virtualization entails creating logical, virtual networks that are decoupled from the underlying network hardware to ensure the network can better integrate with and support increasingly virtual environments. In recent years, enterprises have been adopting network virtualization at a growing rate to take advantage of the flexibility of software-based compute. A set of hardware computing platforms can be organized as a server cluster to provide computing resources for a datacenter.

After deployment of resources to datacenter tenants, field issues that are reported by the tenants have to be addresses by the datacenter customer support and engineering teams. These issues are sometimes not reproducible in internal engineering environment. The reports often do not include enough information to indicate what has led to the state that triggered the issue.

Reproducing tenant issues in house has always been a big challenge for datacenter providers. Currently, reproducing tenant issues is done based on the information passed from the tenant through calls or electronic communication. Reproducing these issues is a tedious process with a lot of shortcomings.

For instance, it is a time consuming, iterative process to have multiple calls to gather the information needed for understanding of the tenant environment, workflows, etc. The information presumed to be obvious is usually not passed along until explicitly asked by the engineering team. This is also applicable when the call receiver understands the information differently. A lot of human resources such as customer service, escalation team, global support services, continuation product development team, and engineering are typically involved in a single customer call.

At times, the customer may not be willing to share the information as the issue occurred in a production environment or a secured environment. Language barriers may also exist when the customers are speaking a different language than the technical support team. The customers and the technical support team may use different technical terms and vocabulary. Bad telephone connections, slow Internet connections, etc., may also hamper the communication.

BRIEF SUMMARY

Some embodiments provide a network workflow replay tool that automates recreation of network issues occurring in the field in a lab environment. The workflow replay tool recreates a datacenter tenant (customer) issues in house by deploying a closely resembling environment and then simulating the customer workflow. The replay tool replicates customer environment in terms of topology and object data store. The replay tool analyzes the logs created in the field to regenerate workflows created in the field. The replay tool replays these workflows in a similar order and generates reports about the objects relationships and interaction with each other for analysis.

Some embodiments provide a method for identifying workflows that have been run in a datacenter tenant environment. The method collects logs from network manager servers, hosts, and other datacenter applications in the tenant environment. The method parses the logs and identifies each component of the logs. The method stores the results in a data structure such as a parse tree or other hierarchical structures.

The method then identifies entities such as events and tasks in the logs based on the properties of the log messages. The method then identifies timestamps and values of logged parameters for each event. The method then identifies the relationship of the events in each task. The method then generates one or more reports based on the relationships, timestamps, and parameter values stored for the events and tasks.

Some embodiments also provide a method that recreates a tenant's environment issues in the lab environment. The method receives a copy of the network manager database backup of each datacenter. The method then generates the object data store of the tenant environment using the network manager database backups. The tenant object data store includes the definition of different entities such as forwarding elements, virtual machines, network connections, etc., of the tenant environment.

The method then replicates the tenant environment in a lab environment by using the generated object data store. For instance, the method allocates the same resources in the lab environment and makes the same connections between the resources in the lab environment as in the tenant's actual environment. The method then utilizes the workflow replay tool reports to identify events and create the timeline of the events. The method then uses the identified events and timelines and re-runs the tenant workflows in the lab environment to recreate tenant environment issues.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for identifying workflows that have been run in a tenant environment. A workflow refers to the particular actions taken place in the tenant environment. The method also uses database backups of a network manager server to recreate a tenant's environment in the lab. The method re-runs the identified workflows on the environment recreated in the lab in order to recreate the tenant environment issues.

I. Network Workflow Replay Tool

Figure 1:
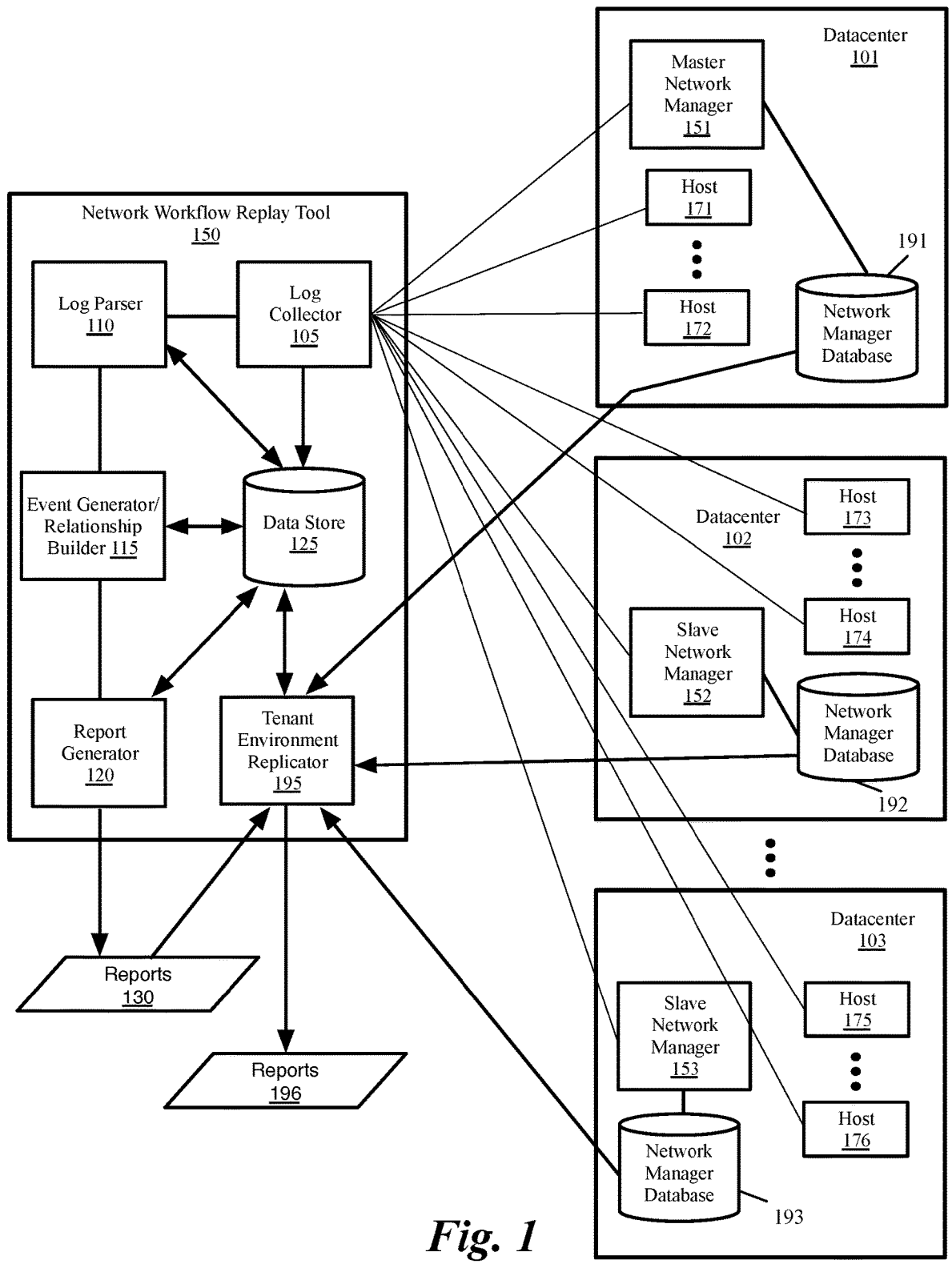
FIG. 1 conceptually illustrates a network workflow replay tool in some embodiments.

FIG. 1 conceptually illustrates a network workflow replay tool in some embodiments. As shown, the network workflow replay tool 150 includes a log collector 105, a log parser 110, an event generator/relationship builder 115, a report generator 120, a tenant environment replicator 195, and a data store 125. The figure also shows several datacenters 101-103. A datacenter is a facility that houses computing resources, networking resources, storage resources, and the associated components for one or more tenants (or customers).

Each datacenter 101-103 includes a network manager 151-153, respectively. A network manager in some embodiments is a virtualized server that is installed on one or more physical servers and is used to define and/or manage the networking resources of a datacenter. As shown, one of the network managers 101 is designated as the master (or primary) network manager and the other network managers 151-153 are designated as slave (or secondary) network managers. Each network manager 151-153 maintains one or more object databases or data stores (one of which is shown for each network manager) 191-193 that store environment configurations of the datacenter tenants. A tenant object data store includes inventory objects fetched from the datacenter as well as tenant created objects. The tenant object data store includes the definition of different entities such as forwarding elements, virtual machines, network connections, etc., of the tenant environment.

Each datacenter also includes one or more hosts 171-176. A host in some embodiments is a physical machine that hosts virtual machines (VMs) or other data compute nodes for one or more tenants. A VM is a software implementation of a machine such as a computer. In some embodiments, some or all host machines include virtualization software (e.g., a hypervisor) for virtualizing physical resources of the host machine. In some embodiments, the virtualization software includes a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are a logical representation of a forwarding element that is presented to a user when designing a logical network.

In some embodiments, several PFEs are distributed throughout the network implement tenant's LFEs, where each PFE is a local instantiation of an LFE that operate across different host machines and can perform Layer 2 (L2)/Layer 3 (L3) packet forwarding between VMs on the host machine or on different host machines. An LFE is sometimes referred to as a virtual distributed switch (VDS). In some embodiments, an LFE spans across multiple datacenters.

The log collector 105 collects log files from network managers, hosts, and other datacenter services such as a distributed firewall. The log collector 105 collects logs related to a particular tenant from different applications in multiple datacenters 101-103. The logs record user operation events and events associated with different system threads. The log collector in some embodiments uses syslog, which is a standard for message logging. The log collector stores the identified logs in the data store 125.

The log parser 110 parses the logs and passes the relevant logs to the event generator/relationship builder 115. For instance, the log parser may identify all logs related to a distributed firewall that spans across multiple datacenters. The log parser in some embodiments receives the log files collected by the log collector (e.g., in the form of text files) and builds a data structure (e.g., in the form of a hierarchical structure such as a parse tree or an abstract syntax tree). The data structure provides a structural representation of the logs, which is used by the event generator to identify events, timestamps, parameter values, etc., from the logs. The log parser stores the data structure in the data store 125.

The event generator/relationship builder 115 uses the data structure generated by the log parser 110 to identify one or more entities such as events, tasks, and event precedence. For instance, the event generator identifies events of interest and attaches timestamp to the events. The events of interest in some embodiments are identified from the parsed log entries via pattern matching based on a predefined set of matching rules. One or more events can be associated with a task. For instance, an event may refer to a log message and a task may refer to a collection of events in a certain order. Examples of tasks include configuring a forwarding element, publishing a firewall rule, or persisting (or storing) a firewall rule. An event precedence is an entity which defines the precedence of the events in a particular Task. An event precedence entity in some embodiments is a state machine that defines the ordering of the events in a particular task.

The event generator/relationship builder 115 extracts the timestamps from the log messages and attaches the timestamps to the corresponding events. The event generator/relationship builder also identifies the relationships among the events by defining the events that precede and events that succeed each event. In some embodiments, when the event generator/relationship builder identifies an initial event of a task, the event generator/relationship builder instantiates a state machine associated with the task to verify the occurrence of subsequent events in the task. The event generator/relationship builder identifies the order of occurrence of each event in the task as well as the timestamps and runtime values of different parameters and variables. The event generator/relationship builder provides a static definition of the relationships among different events of each task.

The event generator/relationship builder 115 stores the events and the associated timestamps and parameter values in the data store 125. The data store in some embodiments stores the events and the associated timestamps as key-value pairs. In these embodiments, objects or records are stored and retrieved by using a key that uniquely identifies the record. Each record can have one or more fields that contain data.

The report generator 120 processes the events based on the timestamps, the relationships among the events, the value of the associated parameters, etc., and generates different reports 130. For instance, in the case of a distributed firewall, the reports in some embodiments provide timelines with details for the distributed firewall realization. The reports indicate how these realization times are varying over time. The reports provide rule realization completeness for cross datacenter environments. The reports are in some embodiments presented (e.g., displayed or printed) through a user interface. The reports are also stored and are used to replay the tenant workflows in order to recreate issues of the tenant environment in a lab environment.

The reports in some embodiments provide the overall realized state of a service such as the distributed firewall in a cross-datacenter solution. The reports provide timelines for rule publishing in a single or cross-datacenter solution. The reports also identify how the rule provisioning time is varying overtime.

The tenant environment replicator 195 receives a copy (or a backup) of the network manager database (or data store) 191-193 of each datacenter and generates the object data store of the tenant environment using the network manager database backups. The tenant object data store includes the definition of different entities such as forwarding elements, virtual machines, network connections, etc., of the tenant environment. The tenant object data store includes the relationships of different logical and physical entities used in the tenant environment. The tenant object data store includes inventory objects fetched from the datacenter as well as tenant created objects.

The tenant environment replicator 195 replicates the tenant environment in the lab environment by using the generated object data store. For instance, the tenant environment replicator allocates the same resources such as hosts, VMs, forwarding elements, etc., in the lab environment (e.g., in one of the datacenters or in a different lab environment) and establishes the same logical relationships between the resources in the lab environment as in the tenant's actual environment. The resources used in the tenant environment include hardware and software resources allocated to the tenant in one or more datacenters. The resources used in the lab environment include hardware and software resources similar to the resources used in the tenant environment. The tenant environment replicator utilizes the workflow replay tool reports 130 and/or the event, tasks, timestamps, and other information generated by the event generator/relationship builder 115 to identify events and create the timeline of the events. The tenant environment replicator uses the identified events and timelines and re-runs the tenant workflows in the lab environment to recreate tenant environment issues. The tenant environment replicator 195 also generates reports 196 to identify the results of running the tenant workflows in the lab environment.

The network workflow replay tool therefore recreates the relationships among the logical entities (or the desired state available in management plane). The network workflow replay tool re-runs the workflows (again at the desired state at management plane level) by parsing the log messages (or events) and identifying workflows, populating the entities (mapped from the recreated environment) and executing the workflows in order to re create the tenant's issues.

The workflow replay tool uses the actual data, which is collected from the tenant's environment and simulates the tenant's environment and workflows. Once the workflows are identified from the collected logs, the information in network manager databases 191-193 is used to identify the entities referred to in the logs. The state machine of the workflows (i.e., the event precedence) is used to execute the workflows in the same fashion as was executed in the tenant environment.

Figure 2:
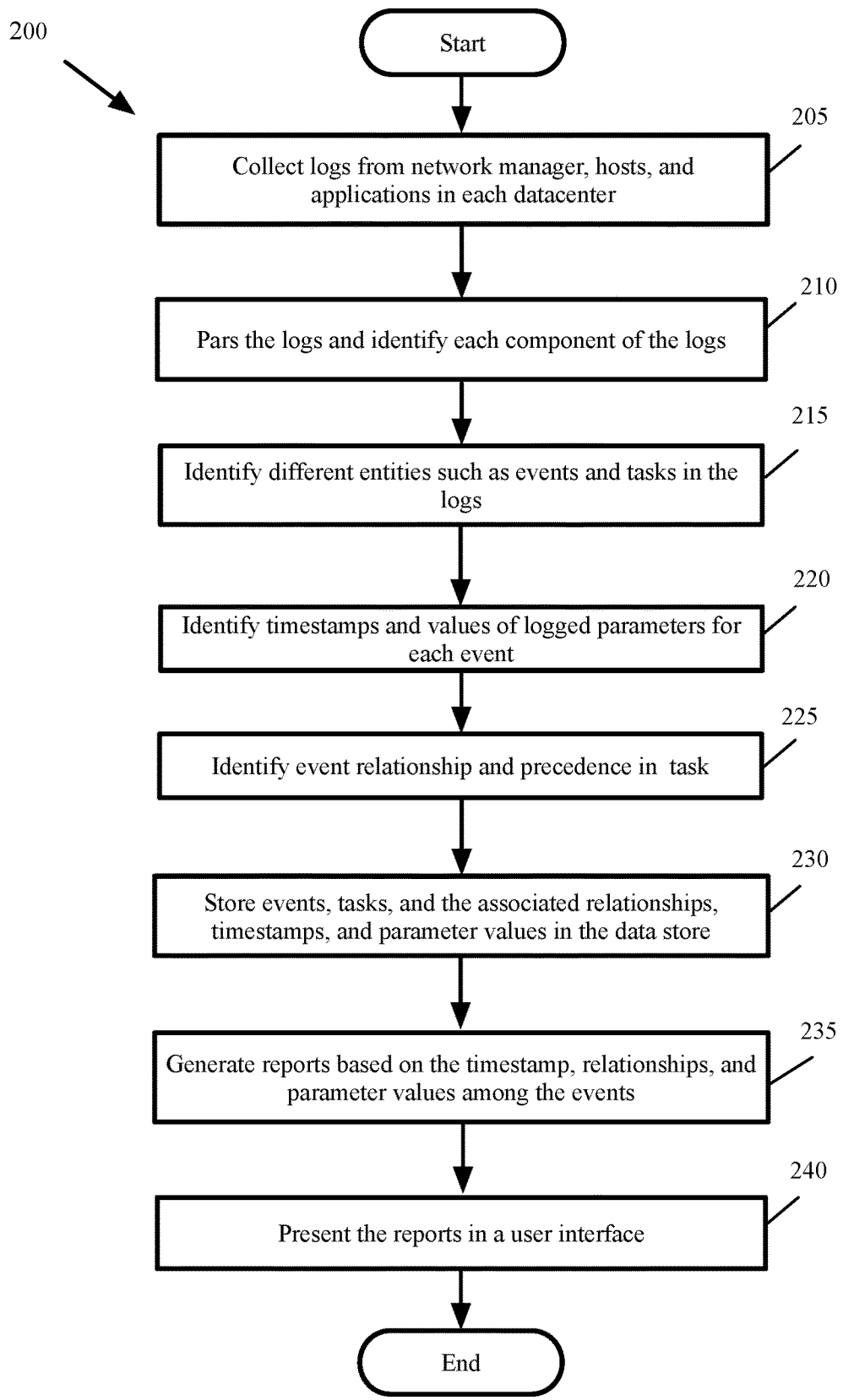
FIG. 2 conceptually illustrates a process for identifying workflows that have been run in a tenant environment in some embodiments.

FIG. 2 conceptually illustrates a process 200 for identifying workflows that have been run in a tenant environment in some embodiments. The process in some embodiments is performed by a network workflow replay tool such as the replay tool 150 in FIG. 1. The process in some embodiments is started in order to identify an issue after the deployment for a datacenter tenant. As shown, the process collects (at 205) logs from network managers, hosts, and other datacenter services such as a distributed firewall. For instance, the process collects logs from several datacenters by the log collector 105 in FIG. 1.

Next, the process parses (at 210) the logs and identifies each component of the logs. For instance, the process parses logs by the log parser 110 in FIG. 1 and stores the results in a data structure. The data structure in some embodiments is in the form of a hierarchical structure such as a parse tree or an abstract syntax tree.

The process then identifies (at 215) entities such as events and tasks in the logs based on the properties of the parsed log messages. For instance, the process identifies events and tasks by the event generator/relationship builder 115 in FIG. 1. An example of an event is a log message that has been generated at a particular time. A task on the other hand is a collection of related events. In some embodiments, the event generator/relationship builder identifies events that are used by the workflow replay tool (e.g., the events that are relevant to recreating a particular issue of a tenant). All other events are either discarded or stored as anonymous evens in a separate data store.

For instance, a firewall publish task can include the following events: (i) a publish begin event for a particular span, (ii) an event for fetching of the rules from database, (iii) an event for computing IP list for data structures (or containers) used in the L3 rules, (iv) an event for computing media access control (MAC) list for data structures used in the Ethernet or L2 rules, (v) an event for computing virtual network interface cards (VNIC) list for data structures used in the AppliedTo fields in both L3 and L2 rules, (vi) a conversion to "protobuf" message event, (vii) an event for putting the message on the broker, (viii) an updating cluster status event, and (ix) a publish end event for the particular span.

The protobuf message in some embodiments is used by a network manager server to send the network firewall rules to the network managers of other datacenters. For instance, the master network manager 151 in FIG. 1 utilizes a protobuf message to send distributed firewall rules to slave network mangers 152-153.

The AppliedTo refers to a tuple in firewall rules. Typically, firewall rule definitions include the following five tuples: source address, source port, destination address, destination port, and service (or application), in addition to an action value. In some embodiments, the firewall rules include an additional tuple (referred to herein as the AppliedTo tuple). The AppliedTo tuple lists a set of enforcement points (network nodes) at which the firewall rule has to be applied.

As another example, a firewall rule persist task can include the following events: (i) a rule received event, (ii) an event for time spent in running validation in user's input, (iii) an event for converting the user input in domain model, (iv) an event for persisting (or storing) the converted user input to the disk, (v) an event for time spent in audit logging, and (vi) an event for control returned back to the user.

Figure 3:
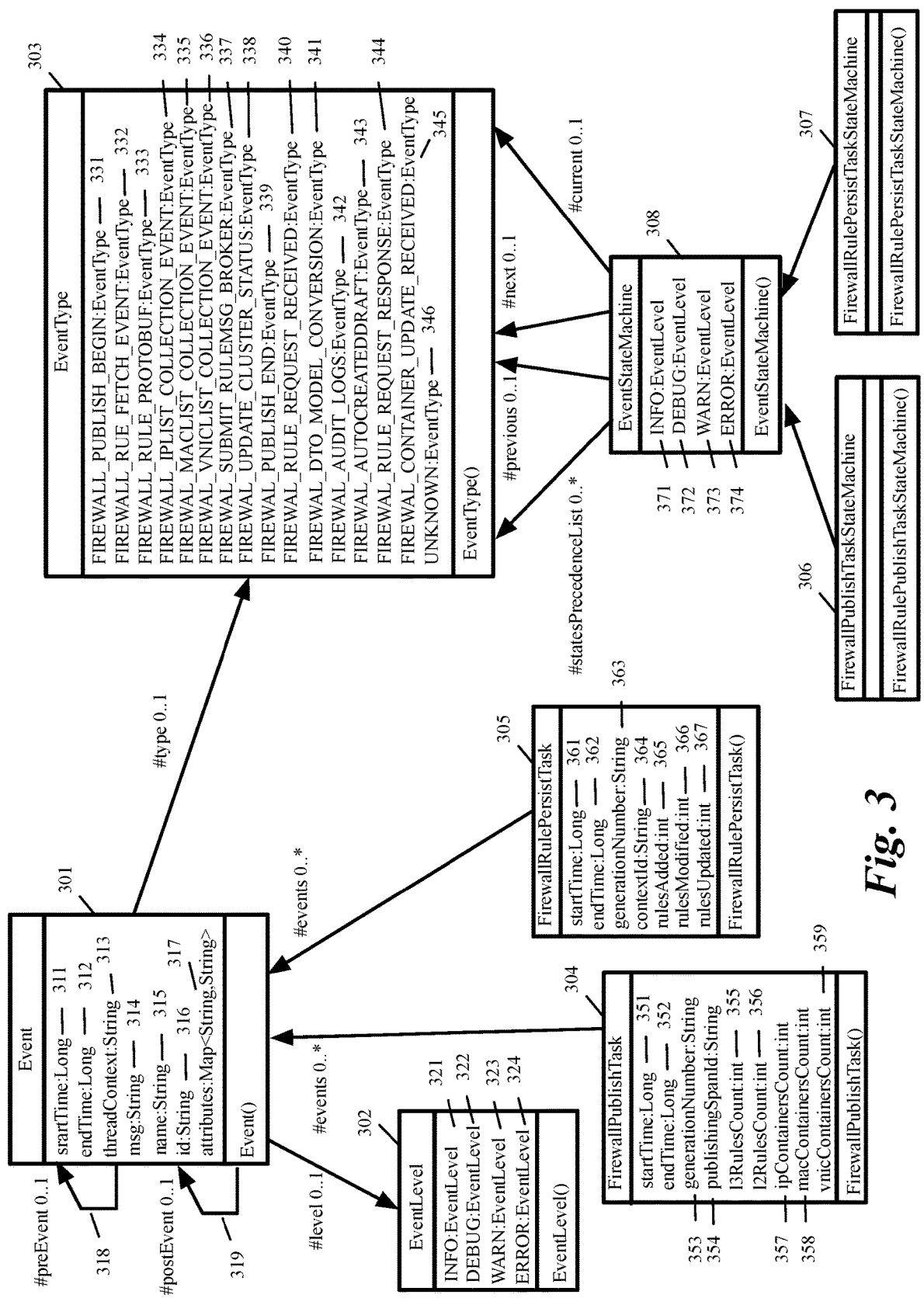
FIG. 3 conceptually illustrates a domain model for firewall events in some embodiments.

FIG. 3 conceptually illustrates a domain model for firewall events in some embodiments. The domain model in this example is shown as Java classes and Java enumerations. A class is a template for defining objects with similar features. A class can include one or more attributes (or variables). As shown, event class 301 includes attributes such as start time 311, end time 312, thread context 313, message 314, name 315, identifier 316, and other attributes 317.

The event class also point to a possible previous event (as shown by 318) and a possible next event (as shown by 319). As shown by Java enumeration 302, an event class 301 can have several levels including information 321, debug 322, warning 323, and error 324.

The event class 301 can also have several types as shown by Java enumeration 303. As shown, the event types include firewall publish begin 331, firewall rule fetch event 332, firewall rule protobuf 333, firewall IP list collection event 334, firewall MAC list collection event 335, firewall VNIC list collection event 336, firewall submit rule message broker 337, firewall update cluster status 338, firewall publish end 339, firewall rule request received 340, firewall data transfer object model conversion 341, firewall audit logs, 342, firewall auto created draft 343, firewall rule request response 344, firewall container update received 345, and unknown event type 346.

As shown, classes firewall publish task 304 and firewall rule persist task 305 inherit from the event class 301. The firewall publish task 304 attributes include start time 351, end time 352, generation number 353, publishing span identification 354, L3 rule count 355, L2 rule count 356, IP containers count 357, MAC containers count 358, VNIC containers count 359. The firewall rule persist task 305 attributes include start time 361, end time 362, generation number 363, context identification 364, rules added 365, rules modified 366, and rules updated 367.

As shown, the two java class firewall publish task state machine 306 and firewall rule persist task state machine 307 inherit from event state machine class 308. The firewall publish task state machine 306 and firewall rule persist task state machine 307 do not have any attributes. The event state machine 308 attributes include event levels such as information 371, debug 372, warning 373, and error 374. The event state machine 308 also has several types as shown by Java enumeration 303, which identifies current, previous, and next event types as well as a states precedence list.

Referring back to FIG. 2, process 200 then identifies (at 220) timestamps and values of logged parameters for each event. For instance, the process analyzes (e.g., by the event generator/relationship builder 115 in FIG. 1) each log message in the data structure generated by the log parser 110 and identifies the time and date included in the log message as the timestamp for the event. The process also identifies the values of different parameters associated with the event in the log message.

The process then identifies (at 225) the relationship (i.e., precedence and antecedence) of the events in each task. Further details of relationship identification are described by reference to FIG. 4, below.

The process then stores (at 230) events, tasks, and the associated timestamps, relationship, and parameter values in the data store. For instance, the process stores the information by the event generator/relationship builder 115 of FIG. 1 in data store 125. The process then generates (at 235) one or more reports based on the relationships, timestamps, and parameter values stored for the events and tasks. Further details of report generation are described by reference to FIG. 5, below. The process then presents (at 240) the reports in a user interface. For instance, the process displays or prints the reports from the user interface. Several examples of the generated reports are described by reference to FIGS. 6-8 below. The process then ends.

Figure 4:
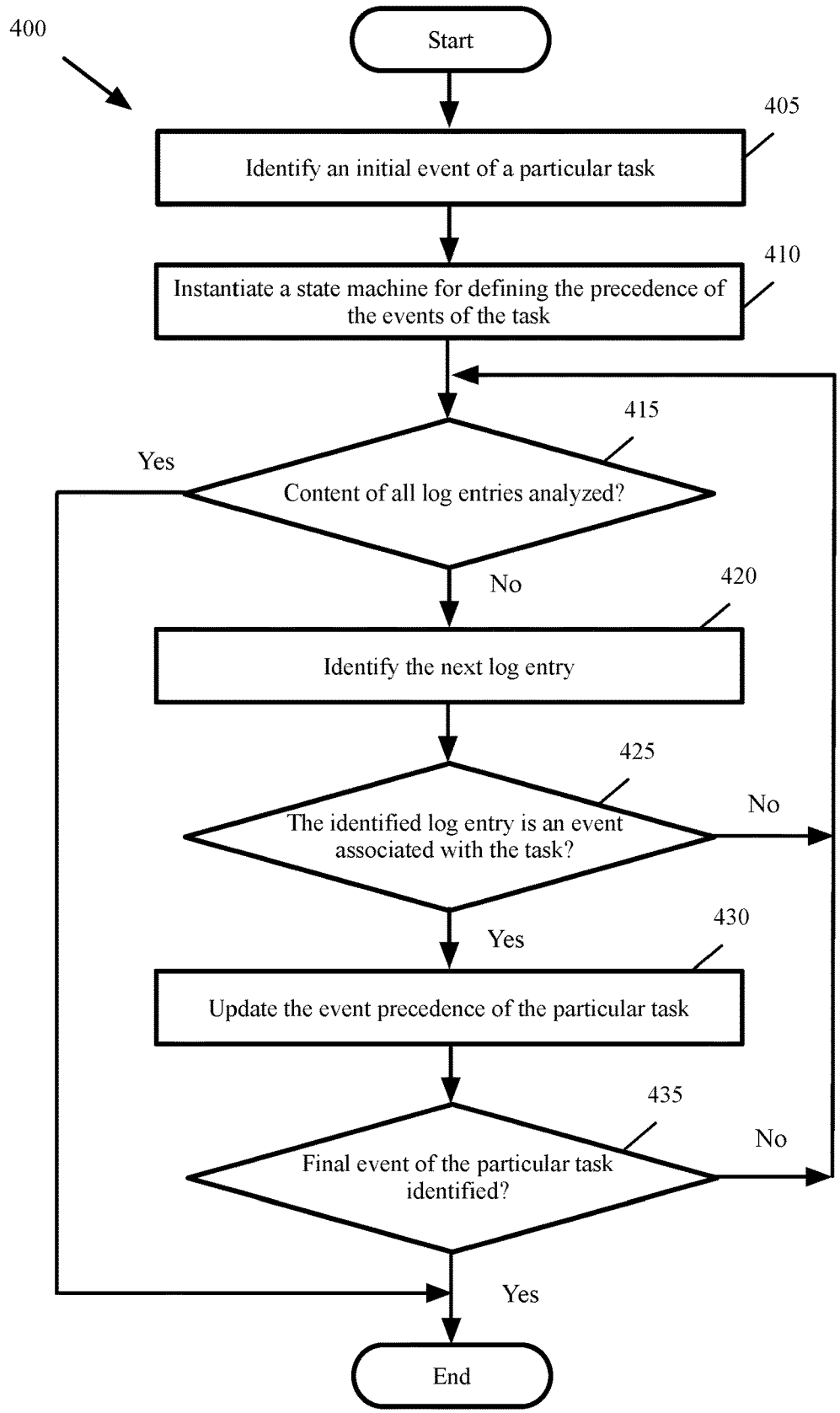
FIG. 4 conceptually illustrates a process for identifying precedence of the events in a particular task.

FIG. 4 conceptually illustrates a process 400 for identifying precedence of the events in a particular task. Process 400 is the detailed description of operation 225 of process 200. Process 400 in some embodiments is performed by an event generator/relationship builder such as event generator/relationship builder 115 in FIG. 1. The events of a task can occur in a particular order. The ordering of the events and their precedence among themselves is statically defined. For example for a firewall publish task the events can be in following order: (i) rule need to be fetched from the database, (ii) IP list need to be computed, (iii) MAC List need to computed, (iv) VNIC List need to be computed, (v) put message on the broker, and (vi) update the cluster status in the database. As an example, there is a strict ordering between events (i) and the other event (i.e., event (i) has to occur first) but there is no strict ordering among events (ii), (iii), and (iv).

As shown, process 400 identifies (at 405) an initial event of a particular task. For instance, the process identifies a "rule need to be fetched from the database" event as the initial event of a firewall publish task. The process then instantiates (at 410) a state machine for defining the precedence of the events of the task.

The process then determines (at 415) whether the content of all log entries are analyzed. If yes, the process ends. Otherwise, the process identifies (at 420) the next log entry. The process then determines (at 425) whether the identified log entry is an event associated with the particular task. For instance, the process determines whether the identified event is an IP list need to be computed, a MAC List need to computed, a VNIC List need to be computed, a put message on the broker, or an update the cluster status in the database event for the firewall publish task. If not, the process proceeds to 415, which is described above.

Otherwise, the process updates (at 430) the event precedence of the particular task. The process then determines (at 435) whether the final event of the particular task is identified. If not, the process proceeds to 415, which was described above. Otherwise, the process ends.

Figure 5:
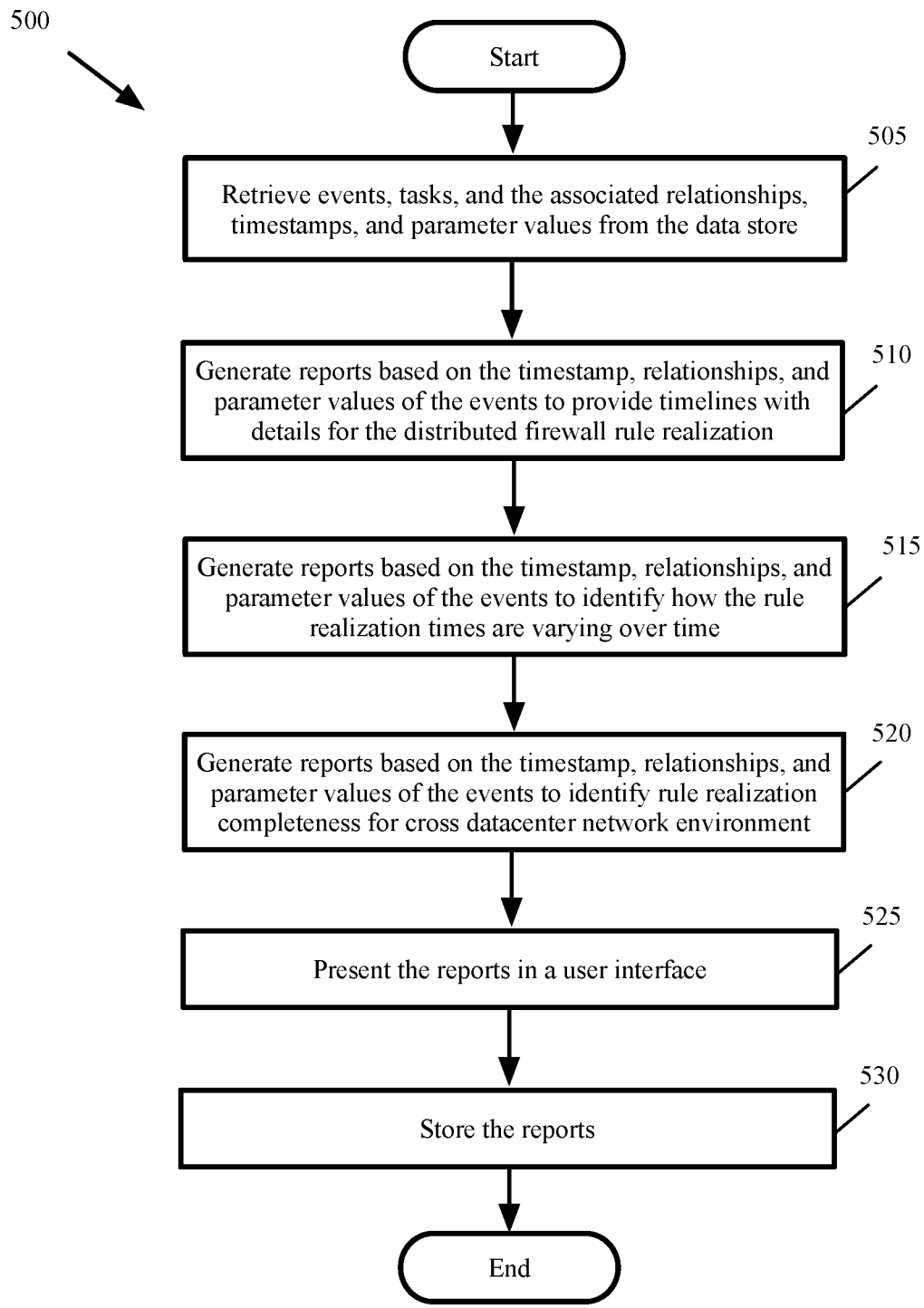
FIG. 5 conceptually illustrates a process for generating reports in some embodiments.

FIG. 5 conceptually illustrates a process 500 for generating reports in some embodiments. Process 500 is the detailed description of operation 235 of process 200. The process in some embodiments is performed by a report generator such as report generator 120 in FIG. 1.

As shown, the process retrieves (at 505) events, tasks, and the associated relationships, timestamps, and parameter values from the data store. The process generates (at 510) reports based on the timestamp, relationship, and parameter values of the events to provide timelines with details of each event (e.g., details of a distributed firewall rule realization).

The process also generates (at 515) reports based on the timestamp, relationship, and parameter values of the events to identify how the rule realization times are varying over time. The process further generates (at 520) reports based on the timestamp, relationship, and parameter values of the events to identify rule realization completeness for cross datacenter network environment. The process then presents (at 525) the report in a user interface. The process then stores (at 530) the reports. The process then ends.

An electronic version of the reports in some embodiments is used by the tenant environment replicator 195 in FIG. 1 (in conjunction with the event, tasks, timestamps, and other information generated by the event generator/relationship builder 115) to identify events and create the timeline of the events in order to re-run the tenant workflows in the lab environment to recreate tenant environment issues. Reports in some embodiments are also used to assist human operators in recreating tenants' environment and rerunning tenants' workflows.

Figure 6:
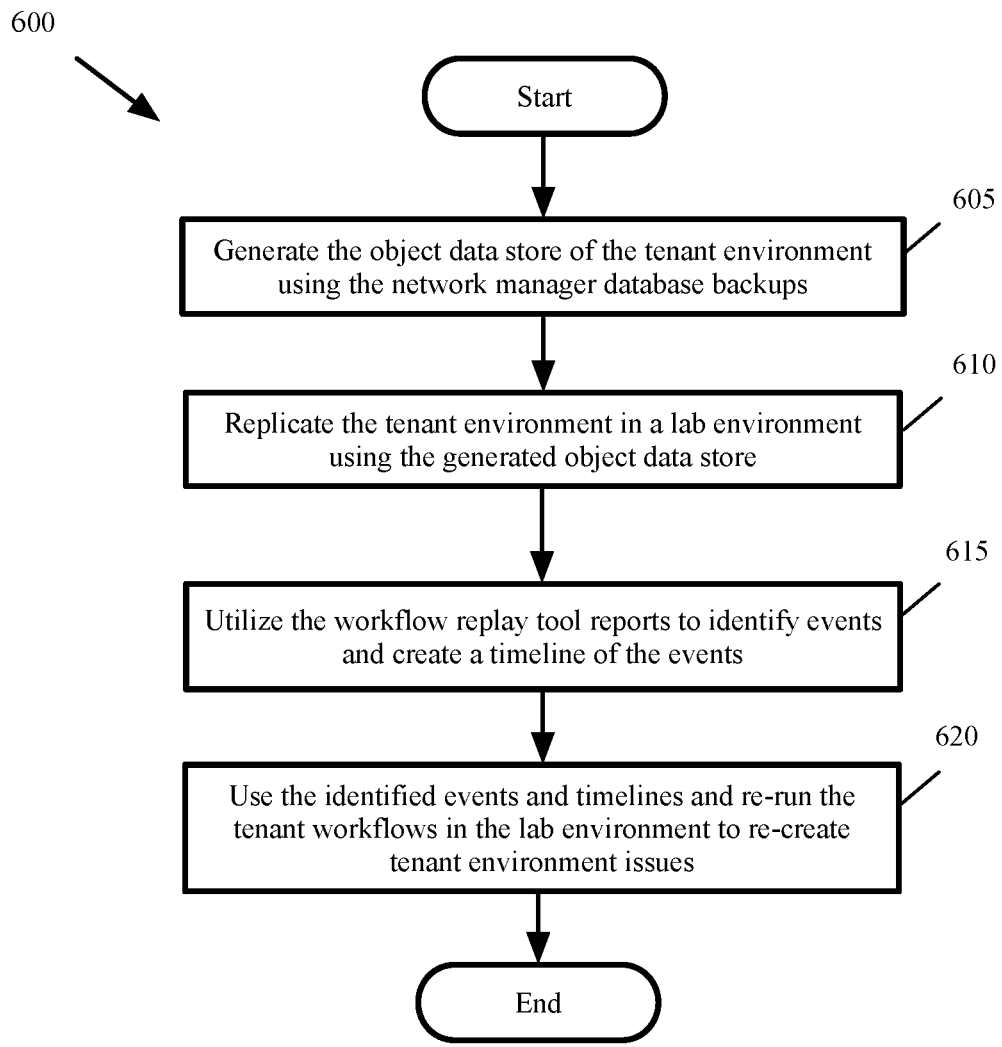
FIG. 6 conceptually illustrates a process for re-creating a tenant's environment issues in the lab environment in some embodiments.

FIG. 6 conceptually illustrates a process 600 for re-creating a tenant's environment issues in the lab environment in some embodiments. The process in some embodiments is performed by a workflow replay tool (e.g., by the network environment replicator 195 of the workflow replay tool 150 in FIG. 1).

As shown, the process generates (at 605) the object data store of the tenant environment using the network manager database backups. The tenant object data store includes the definition of different entities such as forwarding elements, VMs, network connections, etc., of the tenant environment. For instance, the process uses different data structures, logs, etc. in the network manager database to generate the tenant object data store.

The process then replicates (at 610) the tenant environment in the lab environment by using the generated object data store. For instance, the process allocates the same resources in the lab environment and makes the same connections between the resources in the lab environment as in the tenant's actual environment.

The process then utilizes (at 615) the workflow replay tool reports and/or the event, tasks, timestamps, and other information generated by the event generator/relationship builder to identify events and create the timeline of the events. For instance, the process utilizes the reports 130 generated by the report generator 120 and/or the event, tasks, timestamps, and other information generated by the event generator/relationship builder 115 in FIG. 1 to identify the events and timelines for a particular tenant.

The process then uses (at 620) the identified events and timelines and re-runs the tenant workflows in the lab environment to recreate tenant environment issues. The process then ends.

Figure 7:
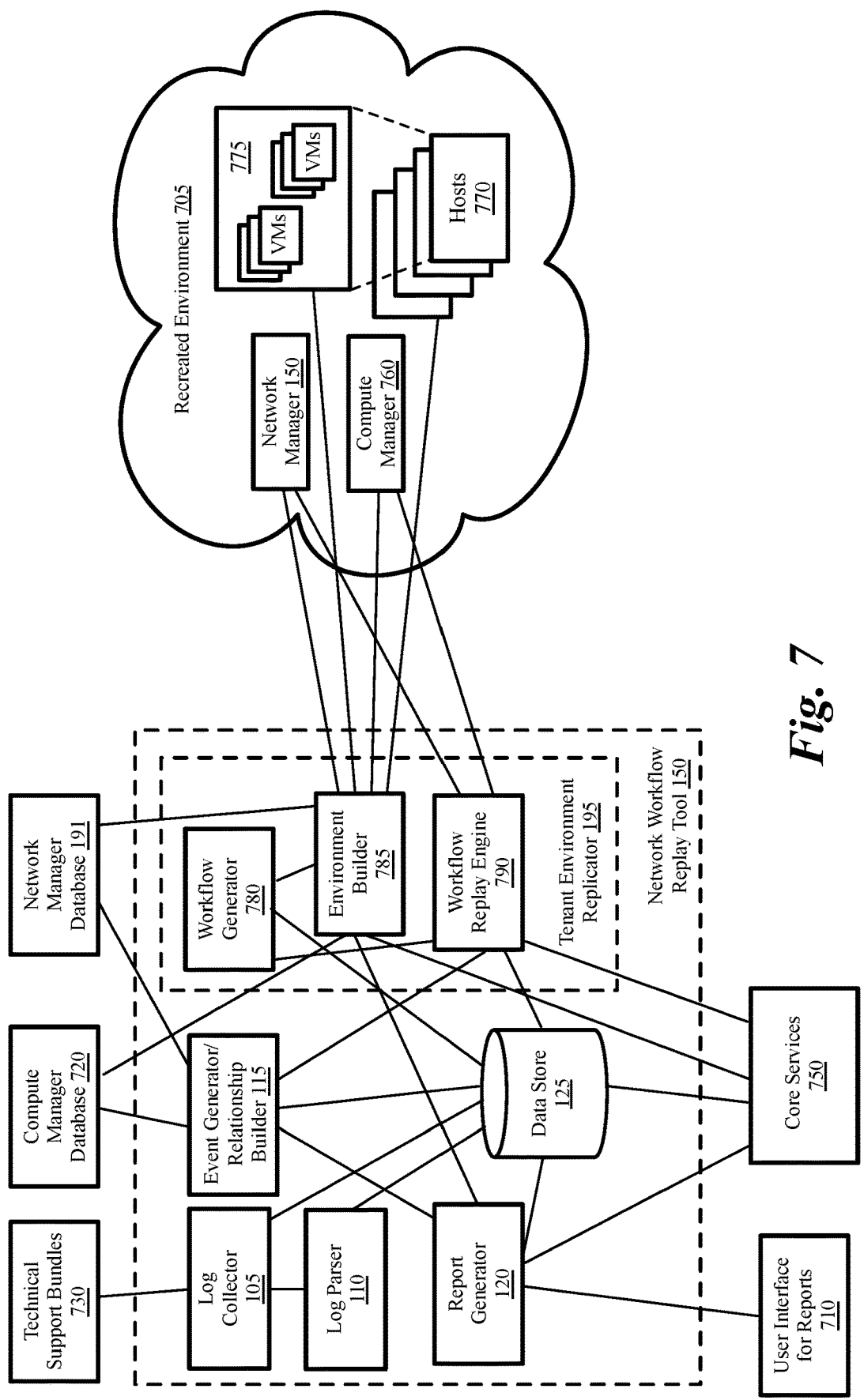
FIG. 7 conceptually illustrates recreating a tenant's environment by the network replay tool of some embodiments.

FIG. 7 conceptually illustrates recreating a tenant's environment by the network replay tool of some embodiments. As shown, the network workflow replay tool 150 includes a log collector 105, a log parser 110, an event generator/relationship builder 115, a report generator 120, a tenant environment replicator 195, and a data store 125. Details of these components were described above by reference to FIG. 1.

The log collector collects tenant's log files from different data centers and stores them in the data store 125. For instance, a tenant's log files in some embodiments are collected from different syslogs and stored in one or more technical support bundles 730. The technical support bundle includes product specific logs, configuration file, encrypted information from different hosts, etc.

The log collector 105 retrieves the tenant's log files from the technical support bundles 730 and stores the collected log files in the data store 125. Log parser parses the log files and generates a data structure. As described above, the data structure provides a structural representation of the logs, which is used by the event generator/relationship builder 115 to identify events, timestamps, parameter values, etc., from the logs. The log parser stores the data structure in the data store 125.

Different log files show events for different user actions such as creating a new PFE, creating new firewall rules, etc. As an example, when a new forwarding element is created, the corresponding log files show that a request to create a forwarding element with a set of parameters such as the forwarding element name, host identification, etc., is received at a certain time. The log files also show workflow items such as defining ports for the forwarding elements, connecting VM VNICs to the forwarding element, connecting physical network interface cards (PNICs) to the forwarding element, creating associated firewall rules, etc.

Based on the log files, the event generator/relationship builder 115 determines which operations the user has performed (e.g., based on the management plane data collected in the log files). The event generator/relationship builder 115 uses the data generated by the log parser 110 to identify one or more entities and the associated events, tasks, and event precedence. The event generator/relationship builder also identifies the relationships among the events by defining the events that precede and events that succeed each event.

The report generator 120 processes the events based on the timestamps, the relationships among the events, the value of the associated parameters, etc., and generates different reports 130. The report generator also uses network manager database 191 and compute manager database 720 (or a backup copy of these databases) to determine relationship between different entities such as VMs, PFEs, LFEs, etc., from the system configuration stored in the network manager and compute manager databases. If a tenant uses hosts in multiple datacenters, the databases of the network manager and computer managers of each datacenter are used by the report generator. The report generator 120 stores the reports in the data store 125. The reports are also provided to a user through a user interface 710.

The tenant environment replicator 190 includes a workflow generator 780, an environment builder 785, and a workflow replay engine 790. The workflow generator uses events timelines included in the reports and generates the tenant workflow. The workflow generator in some embodiments uses the information in the network manager database 191 and compute manager database 720 (or the corresponding backups) to get a snapshot of the tenant environment.

Databases 191 and 720 in each datacenter have a full view of the tenant's datacenter configuration. For instance, the databases may indicate that the tenant has used 2 clusters of hosts in a datacenter and each cluster has 30 hosts. The databases also indicate the number, type, and identification of each VM defined on each host. The databases also show configuration of different PFEs, LFEs, etc., used by the tenant. The network workflow replay tool also identifies the datacenter core services 750 used by the tenant.

Using the database information and the timeline of events in the reports, the workflow generator 780 generates the tenant's workflow. For instance, the workflow generator determines the type of virtualization switch in each host where an VM is deployed by the tenant, the PFEs that are defined on each host, the LFEs that are defined by the PFEs, the VMs that are connected to each LFE or PFE, the firewall rules and the enforcement points that are defined, etc. The workflow generator 780 stores the workflows and their timelines in the data store 125.

The environment builder 785 uses the tenant workflow and identifies different resources such as clusters 795 of hosts 770, type of virtualization software, etc., used by the tenant. The environment builder 785 also identifies the network manager 150 and compute manger 760 resources used by the tenants. The environment recreates a replica 705 of the tenant environment (e.g., deploys similar resources in one or more datacenters or in a lab environment).

The workflow replay engine 790 replays the tenant actions (e.g., defining PFEs, LEFs, connecting the VMs to PFEs or LFEs, creating firewall rules, etc.) in the same sequence as identified in the reports. The workflow replay engine 790 replicates the tenant's actions in the same order the actions were performed in the client environment in order to replicate the tenant's reported issues. The network workflow replay tool 150 in some embodiments is used by technical support personnel to determine the cause of the issues that were reported by the tenant.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
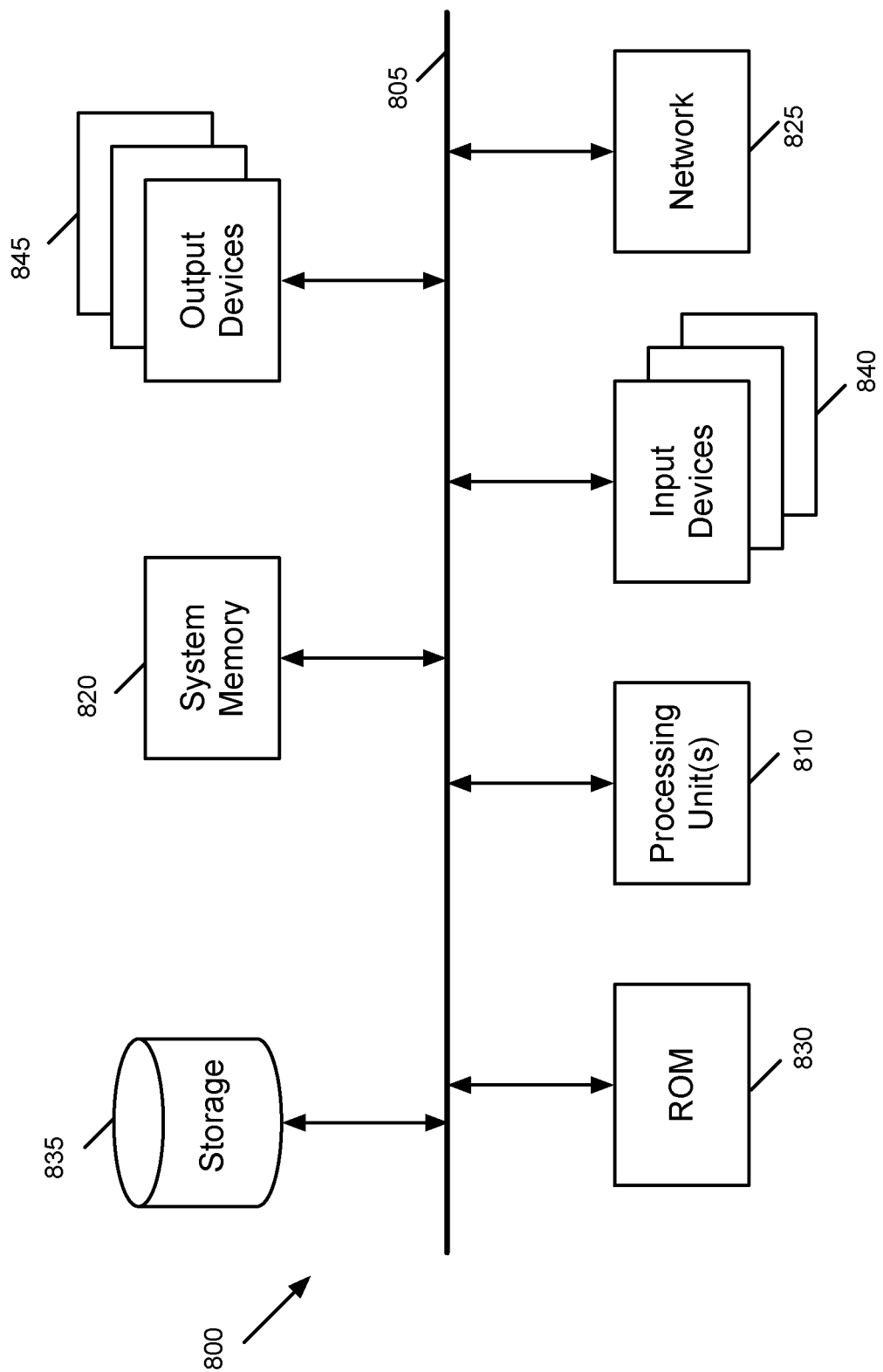
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 820, a read-only memory (ROM) 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 820, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 820 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 820, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2 and 4-6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method, for a workflow replay tool, of automatically identifying and recreating tenant network environment issues in a set of datacenters, the method comprising:
   analyzing, by the workflow replay tool, (i) a set of log files generated in the tenant network environment that spans the set of datacenters and received from network manager servers in each of the datacenters to identify workflows executed by entities of the tenant network, and (ii) network manager server databases of each of the datacenters to identify logical network entities in the tenant network environment that are implemented by physical network entities executing the identified workflows, wherein at least one logical network entity is implemented across multiple physical network entities in the set of datacenters;
   based on the analysis of the network manager server databases of each datacenter, allocating resources in a lab environment to simulate the physical and logical network entities of the tenant network environment; and
   rerunning the workflows identified by the workflow replay tool using the allocated resources simulating the physical and logical network entities of the tenant network environment in the lab environment to recreate the tenant network environment issues.

2. The method of claim 1, wherein analyzing the set of log files comprises identifying a set of tasks in each log file, each task comprising a set of events, each event corresponding to a message in a log file.

3. The method of claim 2, wherein analyzing the set of log files further comprises:
   for each identified task, identifying precedence of the events in the task; and
   identifying timestamps for each event.

4. The method of claim 3 further comprising:
   identifying timelines of the events based on identified timestamps and event precedence; and
   generating reports using the identified precedence and timelines of the events.

5. The method of claim 4, wherein rerunning the workflows identified by the workflow replay tool comprises performing the identified tasks using the identified event precedence for each task and a same timeline as identified for the events.

6. The method of claim 2 further comprising parsing the set of log files into a hierarchical data structure comprising one of a parse tree and an abstract syntax tree, wherein the set of tasks in each log file are identified using the data structure.

7. The method of claim 1, wherein analyzing the network manager server databases comprises identifying a definition of a set of physical network entities in the tenant network environment, the set of physical network entities comprising forwarding elements, data compute nodes (DCNs), and network connections of the tenant environment.

8. The method of claim 1, wherein the at least one logical network entity is a logical forwarding element that is implemented by a set of the physical network entities.

9. The method of claim 1 further comprising:
generating a set of reports based on analysis of the set of log files; and
presenting the generated reports in a user interface.

10. A non-transitory machine readable medium storing a workflow replay tool that when executed by at least one processing unit recreates tenant network environment issues in a set of datacenters, the workflow replay tool comprising sets of instructions for:
analyzing, by the workflow replay tool, (i) a set of log files generated in the tenant network environment across the set of datacenters and received from network manager servers in each of the datacenters to identify workflows executed by entities of the tenant network, and (ii) network manager server databases of each of the datacenters to identify logical network entities in the tenant network environment that are used by physical network entities executing the identified workflows, wherein at least one logical network entity is implemented across multiple physical network entities in the set of datacenters;
based on the analysis of the network manager server databases of each datacenter, allocating resources in a lab environment to simulate the physical and logical network entities of the tenant network environment; and
rerunning the workflows identified by the workflow replay tool using the allocated resources simulating the physical and logical network entities of the tenant network environment in the lab environment to recreate the tenant network environment issues.

11. The non-transitory machine readable medium of claim 10, wherein the set of instructions for analyzing the set of log files comprises a set of instructions for identifying a set of tasks in each log file, each task comprising a set of events, each event corresponding to a message in a log file.

12. The non-transitory machine readable medium of claim 11, wherein the set of instructions for analyzing the set of log files further comprises sets of instructions for:
for each identified task, identifying precedence of the events in the task; and
identifying timestamps for each event.

13. The non-transitory machine readable medium of claim 12, wherein the workflow replay tool further comprises sets of instructions for:
identifying timelines of the events based on identified timestamps and event precedence; and
generating reports using the identified precedence and timelines of the events.

14. The non-transitory machine readable medium of claim 13, wherein the set of instructions for rerunning the workflows identified by the workflow replay tool comprises a set of instructions for performing the identified tasks using the identified event precedence for each task and a same timeline as identified for the events.

15. The non-transitory machine readable medium of claim 10, wherein the workflow replay tool further comprises a set of instructions for parsing the set of log files into a hierarchical data structure comprising one of a parse tree and an abstract syntax tree, wherein the set of tasks in each log file are identified using the data structure.

16. The non-transitory machine readable medium of claim 10, wherein the set of instructions for analyzing the network manager server databases comprises a set of instructions for identifying a definition of a set of physical network entities in the tenant network environment, the set of physical network entities comprising forwarding elements, data compute nodes (DCNs), and network connections of the tenant environment.

17. The non-transitory machine readable medium of claim 10, wherein the at least one logical network entity is a logical forwarding element that is implemented by a set of the physical network entities.

18. A system comprising:
a set of processing unit; and
a non-transitory machine readable medium storing a workflow replay tool that when executed by at least one processing unit recreates tenant network environment issues in a set of datacenters, the workflow replay tool comprising sets of instructions for:
analyzing, by the workflow replay tool, (i) a set of log files generated in the tenant network environment across the set of datacenters and received from network manager servers in each of the datacenters to identify workflows executed by entities of the tenant network, and (ii) network manager server databases of each of the datacenters to identify logical network entities in the tenant network environment that are used by physical network entities executing the identified workflows, wherein at least one logical network entity is implemented across multiple physical network entities in the set of datacenters;
based on the analysis of the network manager server databases of each datacenter, allocating resources in a lab environment to simulate the physical and logical network entities of the tenant network environment; and
rerunning the workflows identified by the workflow replay tool using the allocated resources simulating the physical and logical network entities of the tenant network environment in the lab environment to recreate the tenant network environment issues.

19. The system of claim 18, wherein the set of instructions for analyzing the set of log files comprises a set of instructions for identifying a set of tasks in each log file, each task comprising a set of events, each event corresponding to a message in a log file.

20. The system of claim 19, wherein the set of instructions for analyzing the set of log files further comprises sets of instructions for:
identifying event precedence of the events in each of the identified tasks; and
identifying timestamps for each event.

21. The system of claim 19, the workflow replay tool further comprising a set of instructions for parsing the log files into a hierarchical data structure comprising one of a parse tree and an abstract syntax tree, wherein the set of instructions for analyzing the log files comprises a set of instructions for identifying the set of tasks in each log file using the data structure.

22. The system of claim 18, wherein the at least one logical network entity is a logical forwarding element that is implemented by a set of the physical network entities.

* * * * *